June 1, 1954  M. P. SCHIRA, JR  2,679,851
AUTOMOBILE RADIATOR AND CYLINDER BLOCK CLEANING DEVICE
Filed Oct. 6, 1950
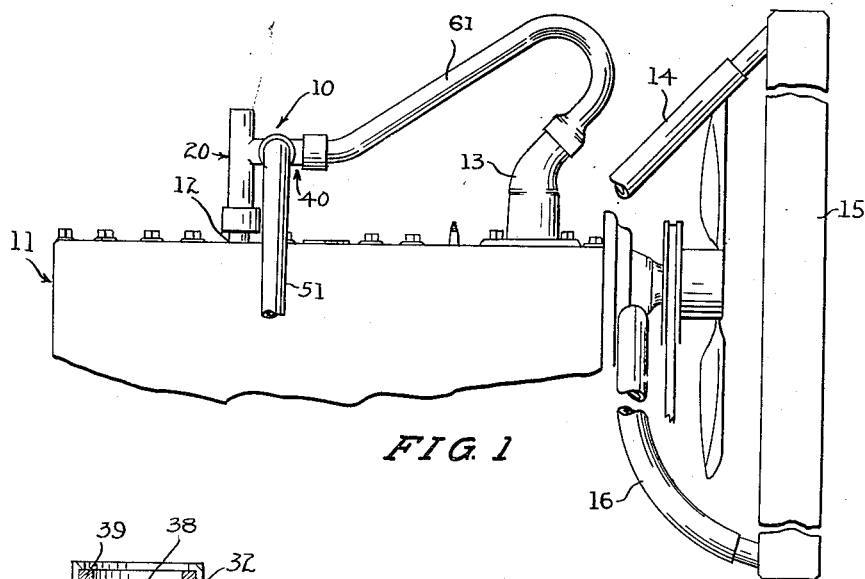
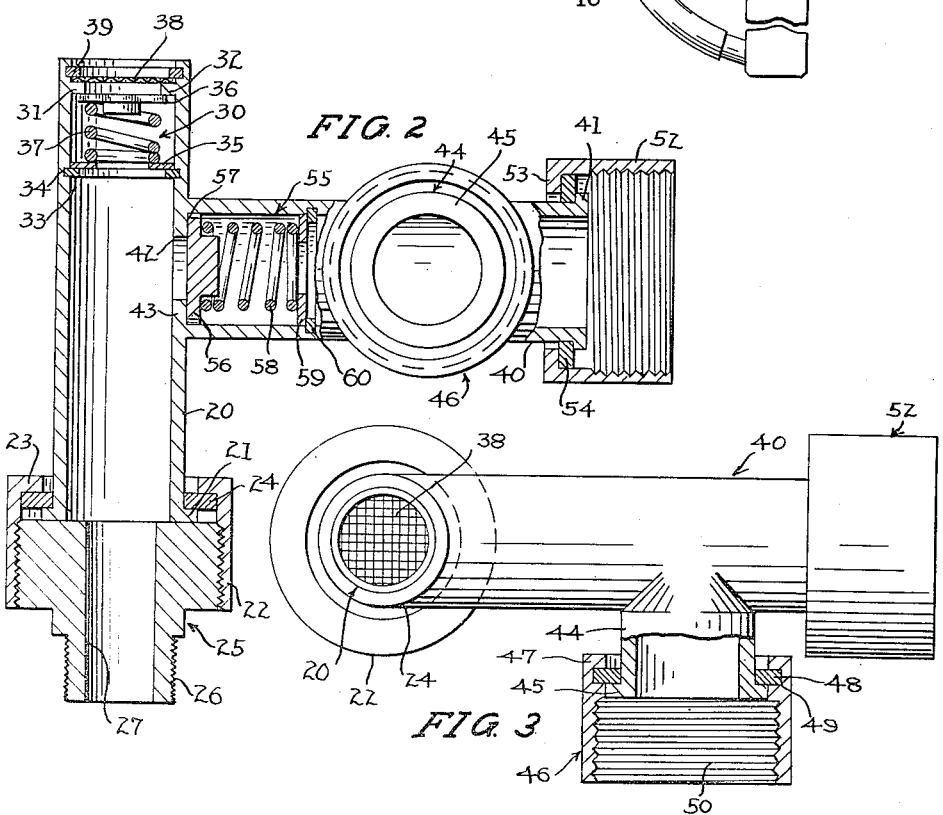
INVENTOR.
MARTIN P. SCHIRA JR.
BY
McMorrow, Berman & Davidson
ATTORNEYS Patented June 1, 1954

2,679,851

UNITED STATES PATENT OFFICE 2,679,851

AUTOMOBILE RADIATOR AND CYLINDER BLOCK CLEANING DEVICE

Martin P. Schira, Jr., Spring Lake Heights, N. J.

Application October 6, 1950, Serial No. 188,777

1 Claim. (Cl. 134—102)

This invention relates to an apparatus for flushing water-cooling systems, and more particularly to an automobile radiator and cylinder block reverse flushing device which operates by pressure obtained from a spark plug hole of the engine while the engine is operating.

An object of this invention is to provide an automobile radiator and cylinder block cleaning device of this character which is designed to circulate fluid in a turbulent state through the automobile engine cooling system in a direction reverse from the direction in which the fluid normally flows in the cooling system.

A further object of this invention is to provide an automobile radiator and cylinder block cleaning device of the character indicated above which is relatively simple in structure and cheap to manufacture and can be easily installed and removed from the engine.

The above and still further objects and advantages of the invention will become apparent upon consideration of the following detailed description of the invention, when taken in conjunction with the accompanying drawings, wherein:

Figure 1 is a side elevational view of an automobile radiator and cylinder block cleaning device of the present invention, shown installed on the engine block for reverse flushing of the cooling system of the automobile;

Figure 2 is an elevational view of the radiator and cylinder block cleaning device, with parts broken away and shown in section; and Figure 3 is a top plan view of the radiator and cylinder block cleaning device shown in Figure 2, with parts broken away and shown in section.

Referring now more particularly to the drawings, wherein like reference numerals have been used throughout the several views to designate like parts, the illustrated automobile radiator and cylinder block cleaning device is shown installed on internal combustion engine cylinder block 11 having an outlet fitting 13 to which the upper radiator hose 14 leading to the radiator 15 is normally connected. The engine block 11 is connected to the radiator 15 by means of a lower hose 16, the cooling water normally flowing from the radiator 15 through the hose 16 and into the block 11.

The radiator and cylinder block cleaning device 10 includes an elongated, open-ended, tubular, normally vertical body 20 which is provided with an external, annular flange 21 contiguous to its lower end. Circumposed about the lower end of the main body 20 is a coupling collar 22 which has one end provided with an inwardly projecting, annular flange 23. Interposed between the annular flanges 21 and 23 is a locking ring 24 which is circumposed on the main body 20 and connects the coupling collar 22 to the main body. Dependingly carried by the coupling collar 22 is an adapter 25 which is threaded in the collar 22 and has a reduced depending externally threaded nipple 26, adapted to be threaded into a spark plug hole 12 of the block 11. The adapter 25 is provided with an axial bore 27 providing communication between the interior of the cylinder of the engine block and the interior of the main body 20 of the device 10.

Normally closing the open upper end of the body 20 is an air inlet check valve 30 which is arranged to admit outside air into the body 20 in response to an intake stroke of the piston in the related engine cylinder. The inlet check valve includes a valve seat 31 spaced from the upper end of the body 20, the seat 31 being formed by an inwardly projecting annular flange 32 carried by the body 20. Spaced below the valve seat 31 is a locking ring 33 which is supported in an annular groove 34 provided in the valve body 20, the locking ring 33 supporting a spring retainer 35. Located between the locking ring 33 and the seat 31 is a valve element 36 which is movable into and out of engagement with the seat 31. Compressed between the valve element 36 and the retainer 35 is a spring 37 which normally biases the valve element 36 to the closed position in engagement with the seat 31.

Resting upon the upper side of the annular flange 32 is a screen 38 which is secured in place by a lock ring 39 engaged within the adjacent bounding walls of the main body 20. The screen 38 filters the air which is drawn into the body 20.

Projecting laterally outwardly from the body 20 at a point between its upper and lower ends is a tubular arm 40 which has its inward end in communication with the interior of the body and its outward end open. The outward end is provided wtih an external annular flange 41. A reduced port 42 is provided in the sidewall of the body 20 in line with and opening into the inward end of the arm 40 whereby an internal flange 43 is defined.

Projecting laterally outwardly from the arm 40 at a point intermediate the ends thereof is a tubular fitting 44 which has one end connected in communication with the interior of the arm 40, its other end being open and provided with an external annular flange 45. Circumposed about the flanged end of the fitting 44 is a coupling collar 46 which has one end provided with an internal annular flange 47 spaced inwardly of the flange 45. Interposed between the flanges 45 and 47 and circumposed on the fitting 44 is a locking rim 48, positioned in a groove 49 provided in the coupling collar 46 to support the coupling collar 46 on the fitting 44. The coupling collar 46 is internally threaded, as indicated at 50 to adapt the coupling for connection to an external source of fluid pressure, such as an ordinary garden hose 51, for introducing water into the arm 40.

A coupling collar 52 on the outer end of the arm 40 is provided for connecting the arm 40 to the engine block outlet fitting 13 and thereby provide for a closed flow path for the water introduced through the fitting 44, through the engine block 11, the lower radiator hose 16, and the upper radiator hose 14. The coupling collar 52 is provided with an internal, annular flange 53 which is spaced from the external annular flange 41 on the arm 40 and is connected thereto by a locking ring 54.

Normally closing the reduced port 42 is an outlet check valve 55 which opens on a compression stroke of the piston of the related cylinder to permit air to flow into the arm 40 from the body 20. The air thus introduced under pressure into the arm 40 admixes with the water entering through the fitting 44, and the resultant turbulent admixture is forced through the engine block 11 and the radiator 15 in a direction reverse from the direction in which the fluid normally circulates during the operation of the engine. The circulating admixture of air and water loosens scale, sludge and other foreign matter accumulated in the cooling system, and the cleaning operation can be continued until the aforementioned accumulations are removed from within the cooling system. The device does not require any attention, and accordingly can be installed and left unattended for any desired period of time. The outlet check valve 55 includes a valve element 56 which engages the seat 57 provided by the adjacent face of the internal, annular flange 43, the valve element 56 being biased into engagement with the seat 57 by means of the valve spring 58. The valve spring 58 is held under compression by means of a retainer ring 59 which is held against displacement longitudinally of the body 40 by means of the lock ring 60.

In actual use, one spark plug of the engine to be flushed is removed and the adapter 25 is detachably secured within the spark plug opening. The upper radiator hose 14 is disconnected from the block outlet fitting 13 and another hose 61 is connected between fitting 13 and the arm 40, a water hose 51 is then connected to the fitting 44 and to a source of water under pressure. The water supply is then turned on and the engine is started, whereupon the aforementioned admixture of turbulent water and air is forced through the engine block 11 and the radiator 15 to effect the cleaning action.

Although only one embodiment of the automobile radiator and cylinder block cleaning device has been described, it is readily apparent that numerous modifications of the present invention can be made without departing from the spirit of the invention as set forth in the appended claim.

What I claim is:

In an internal combustion engine cooling system cleaner, a straight tubular body open at its ends, an adapter secured on one end of said body arranged for connection to a source of alternating pressure and suction, an outside air inlet valve normally closing the other end of the body and arranged to open to admit outside air into the body only when suction is exerted in said body by said source, a straight tubular arm projecting laterally outwardly from said body, a port formed in the sidewall of the body between said adapter and said inlet valve and providing communication between the arm and said body, means on the laterally outward end of said arm providing for connection of said arm with the block outlet of the engine, a tubular fitting on said arm and communicating with the interior of the arm at a point intermediate the ends thereof, means on said fitting providing for connection thereof with an outside source of liquid under pressure, and another valve in said arm normally closing said port and arranged to open to admit air under pressure from said body into said arm only when pressure is exerted by said source of alternating pressure and suction.

References Cited in the file of this patent

UNITED STATES PATENTS

| Number | Name | Date |
|---|---|---|
| 1,821,789 | Borgeson | Sept. 1, 1931 |
| 1,912,589 | Muehl | June 6, 1933 |
| 1,939,863 | Tolfree | Dec. 19, 1933 |
| 1,969,295 | Davis | Aug. 7, 1934 |
| 2,222,516 | Powell | Nov. 19, 1940 |
| 2,245,195 | Hopkins | June 10, 1941 |